(12) United States Patent
Tsai

(10) Patent No.: US 8,006,810 B2
(45) Date of Patent: Aug. 30, 2011

(54) QUICK-RELEASE DEVICE OF A BICYCLE BRAKE CABLE

(75) Inventor: Szu-Fang Tsai, Changhua (TW)

(73) Assignee: Tektro Technology Corporation, Changhua (TW)

(*) Notice: Subject to any disclaimer, the term of this patent is extended or adjusted under 35 U.S.C. 154(b) by 871 days.

(21) Appl. No.: 12/028,928

(22) Filed: Feb. 11, 2008

(65) Prior Publication Data

US 2009/0200119 A1   Aug. 13, 2009

(51) Int. Cl.
*B62L 3/00* (2006.01)
(52) U.S. Cl. .............. 188/24.22; 188/2 D; 188/24.19; 74/489; 74/502.2
(58) Field of Classification Search ............ 188/24.22, 188/24.19, 24.12, 2 D; 74/489, 502.2, 500.5, 74/501.6, 522, 488
See application file for complete search history.

(56) References Cited

U.S. PATENT DOCUMENTS

| 3,759,352 | A | * | 9/1973 | Toplis | 74/501.5 R |
| 3,997,030 | A | * | 12/1976 | Yoshigai | 188/24.12 |
| 5,660,082 | A | * | 8/1997 | Hsieh | 74/502.2 |
| 5,839,544 | A | * | 11/1998 | Yamashita | 188/24.19 |
| 6,161,448 | A | * | 12/2000 | Wang | 74/502.2 |
| 6,651,523 | B2 | * | 11/2003 | Chou | 74/502.2 |
| 7,000,739 | B2 | * | 2/2006 | Ciamillo | 188/24.22 |
| 7,240,772 | B2 | * | 7/2007 | Tsai | 188/24.22 |
| 7,243,762 | B2 | * | 7/2007 | Tsai | 188/24.22 |
| 7,628,094 | B2 | * | 12/2009 | Owyang | 74/500.5 |
| 7,802,660 | B2 | * | 9/2010 | Tsai | 188/24.13 |
| 2009/0078512 | A1 | * | 3/2009 | Edwards et al. | 188/24.12 |

* cited by examiner

*Primary Examiner* — Robert Siconolfi
*Assistant Examiner* — Mariano Sy

(57) ABSTRACT

A quick-release device of a bicycle brake cable includes a main frame mounted to a handlebar of the bicycle, a lever pivotally mounted to the main frame and a push device mounted in the main frame to normally push the lever for selective changing the position between the lever and the push device and the tension of the brake cable.

1 Claim, 5 Drawing Sheets

QUICK-RELEASE DEVICE OF A BICYCLE BRAKE CABLE

BACKGROUND OF THE INVENTION

1. Field of the Invention

The present invention relates to quick-release device, and more particularly to a quick-release device of a bicycle brake cable, which is mounted relative to a brake lever.

2. Description of Related Art

A brake device of a bicycle must be designed under two factors including brake effect and quickly releasing the tension of the brake cable when changing the wheel. A conventional brake device of a bicycle includes an L-shaped guider mounted to a free end of a brake arm and two brake pads for clamping the wheel rim to achieve the effect of brake. However, the two brake pads are very closed to the wheel rim and the tire has a diameter greater than a width of the wheel rim. Consequently, the tension of the brake cable must be greatly released to enlarge the width between the two brake pads before changing the wheel. As a result, the tension of the brake cable must be adjusted again after changing the wheel. It will take a lot of time when changing the wheel.

The present invention has arisen to mitigate and/or obviate the disadvantages of the conventional brake device of a bicycle.

SUMMARY OF THE INVENTION

The main objective of the present invention is to provide a quick-release device of a bicycle brake cable, which is mounted relative to a brake lever for quickly releasing the tension of the brake cable.

To achieve the objective, quick-release device in accordance with the present invention comprises a main frame mounted to a handlebar of the bicycle, a lever pivotally mounted to the main frame and a push device mounted in the main frame to normally push the lever for selective changing the position between the lever and the push device and the tension of the brake cable.

Further benefits and advantages of the present invention will become apparent after a careful reading of the detailed description with appropriate reference to the accompanying drawings.

DETAILED DESCRIPTION OF THE INVENTION

Figure 1:
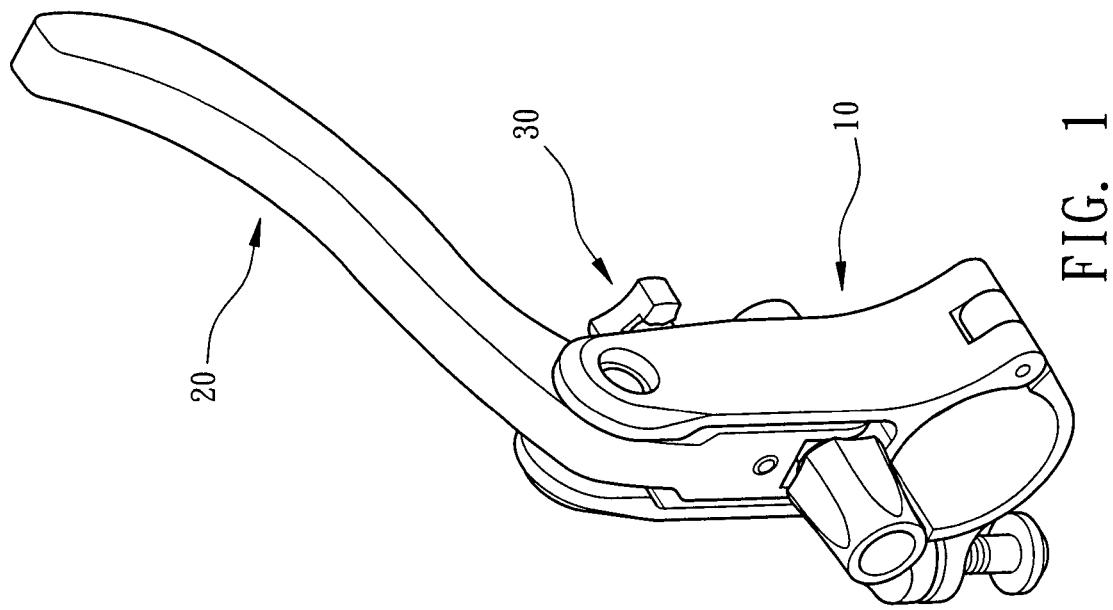
FIG. 1 is a perspective view of a quick-release device of a bicycle brake cable in accordance with the present invention.
Figure 2:
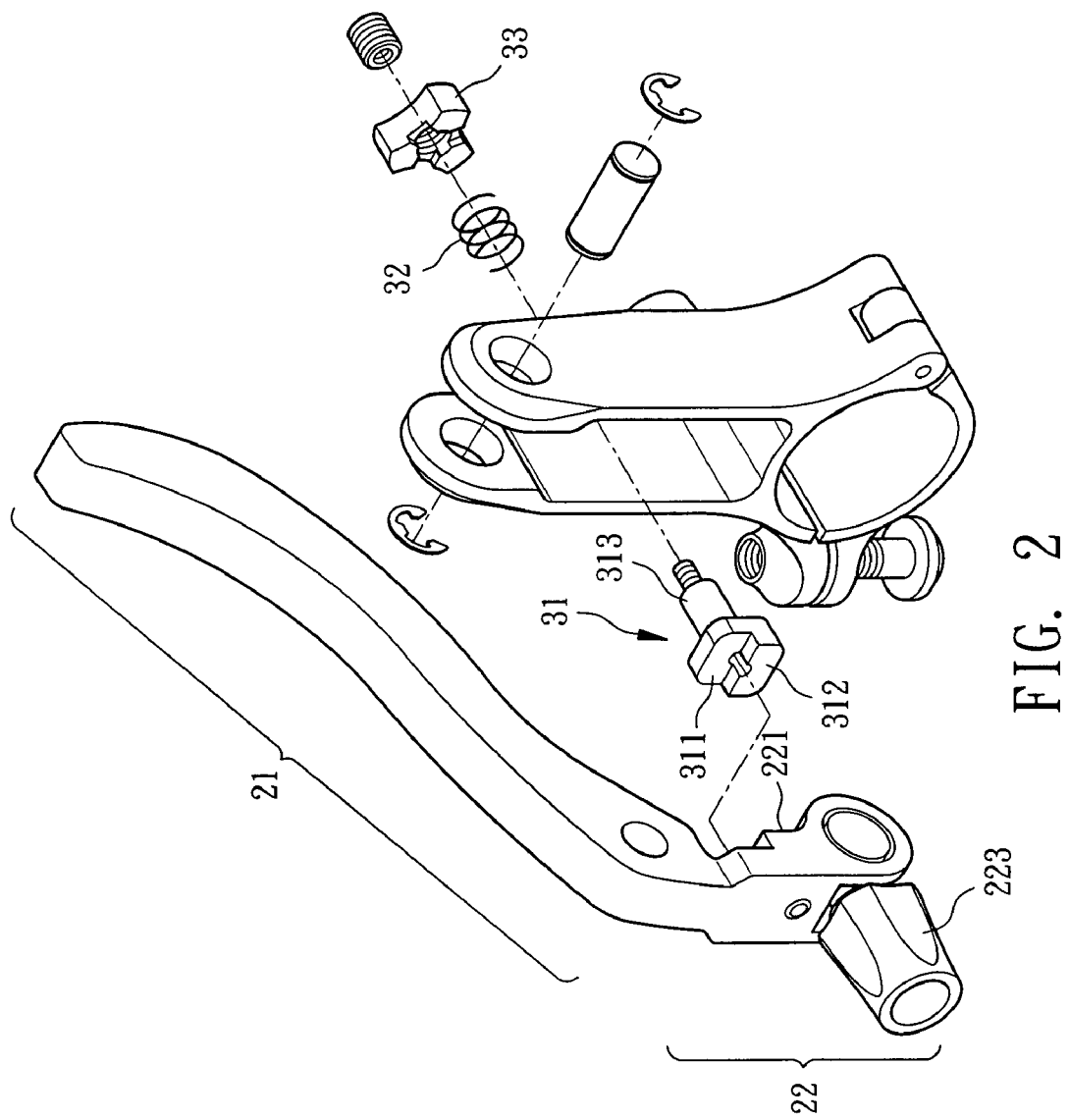
FIG. 2 is an exploded perspective view of the quick-release device in FIG. 1.
Figure 3:
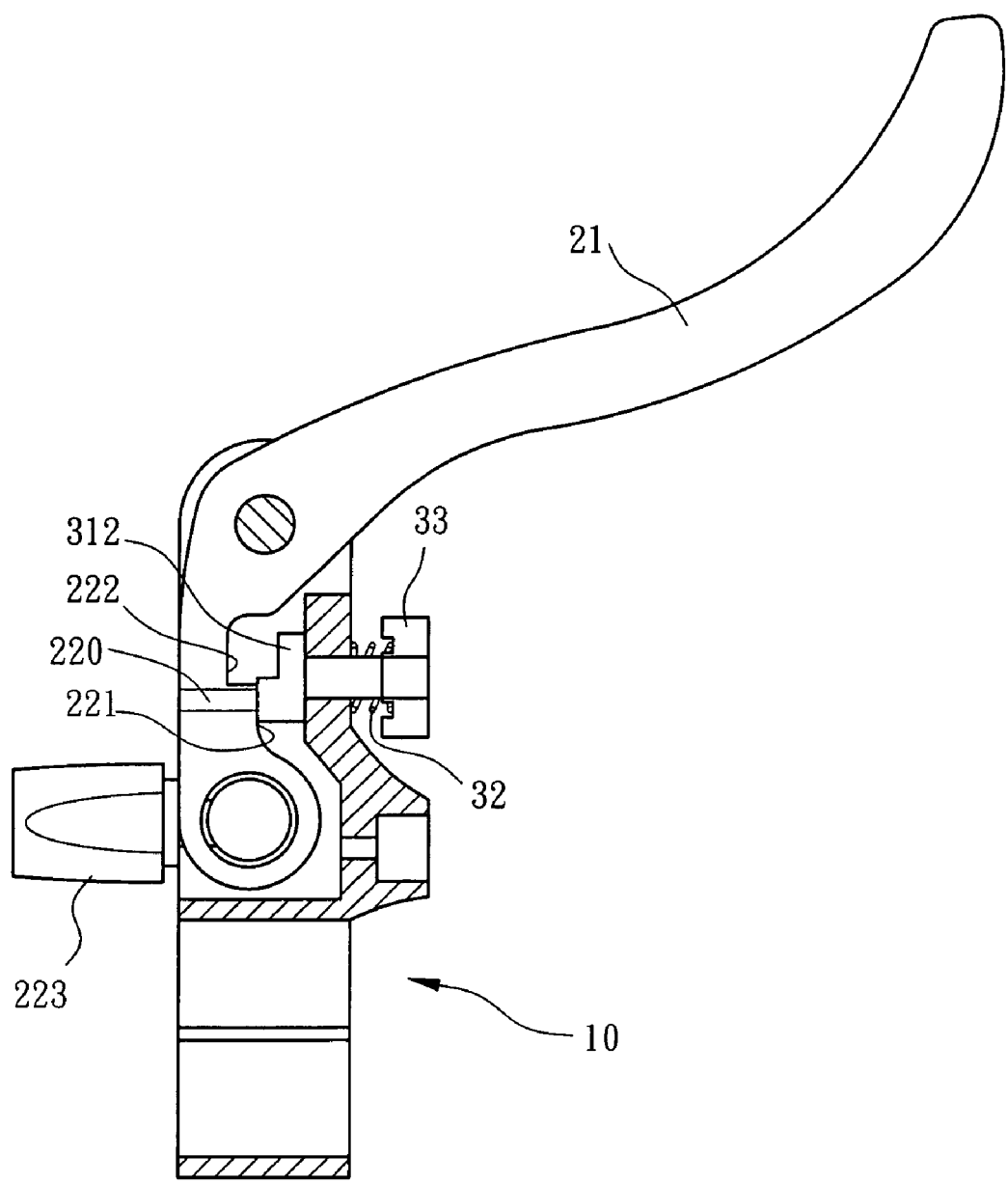
FIG. 3 is a cross-sectional view of the quick-release device in FIG. 1.

Referring to the drawings and initially to FIGS. 1-3, a quick-release device of a bicycle brake cable in accordance with the present invention comprises a main frame (10) adapted to be mounted to a handlebar of a bicycle, a lever (20) pivotally mounted to the main frame (10) and a push device (30) mounted in the main frame (10) to normally push the lever (20) for maintaining the tension of the brake cable.

The lever (20) is L-shaped and has a pivot point that divided the lever (20) into a holding section (21) and a drive section (22), wherein the drive section (22) is received in the main frame (10) when the lever (20) is in a free condition.

The drive section (22) of the lever (20) has a push face (221) formed on one side thereof and facing the main frame (10), and a groove (222) defined in the drive section (22) between the push face (221) and the pivot point of the lever (20). A pusher (223) is mounted to a free end of the drive section (22). The pusher (223) pushes an outer tube of the brake cable for braking the wheel when the rider operating the holding section (21).

The push device (30) includes an axle (31) rotatably extending through the main frame (10). The axle (31) has an enlarged head (311) facing the drive section (22). The enlarged head (311) has a block (312) extending therefrom and abutting against the push face (221) when the lever (20) is in a free condition. A pivot (313) extends from the enlarged head (311) and runs through the main frame (10). A torsion spring (32) and knob (33) are sequentially sleeved on and mounted to the pivot (313) after the pivot (313) extending through the main frame (10). The knob (33) is provided for user to easily rotate the axle (31) and the torsion spring (32) provides a restitution force to the axle (31) after being rotated.

Figure 4:
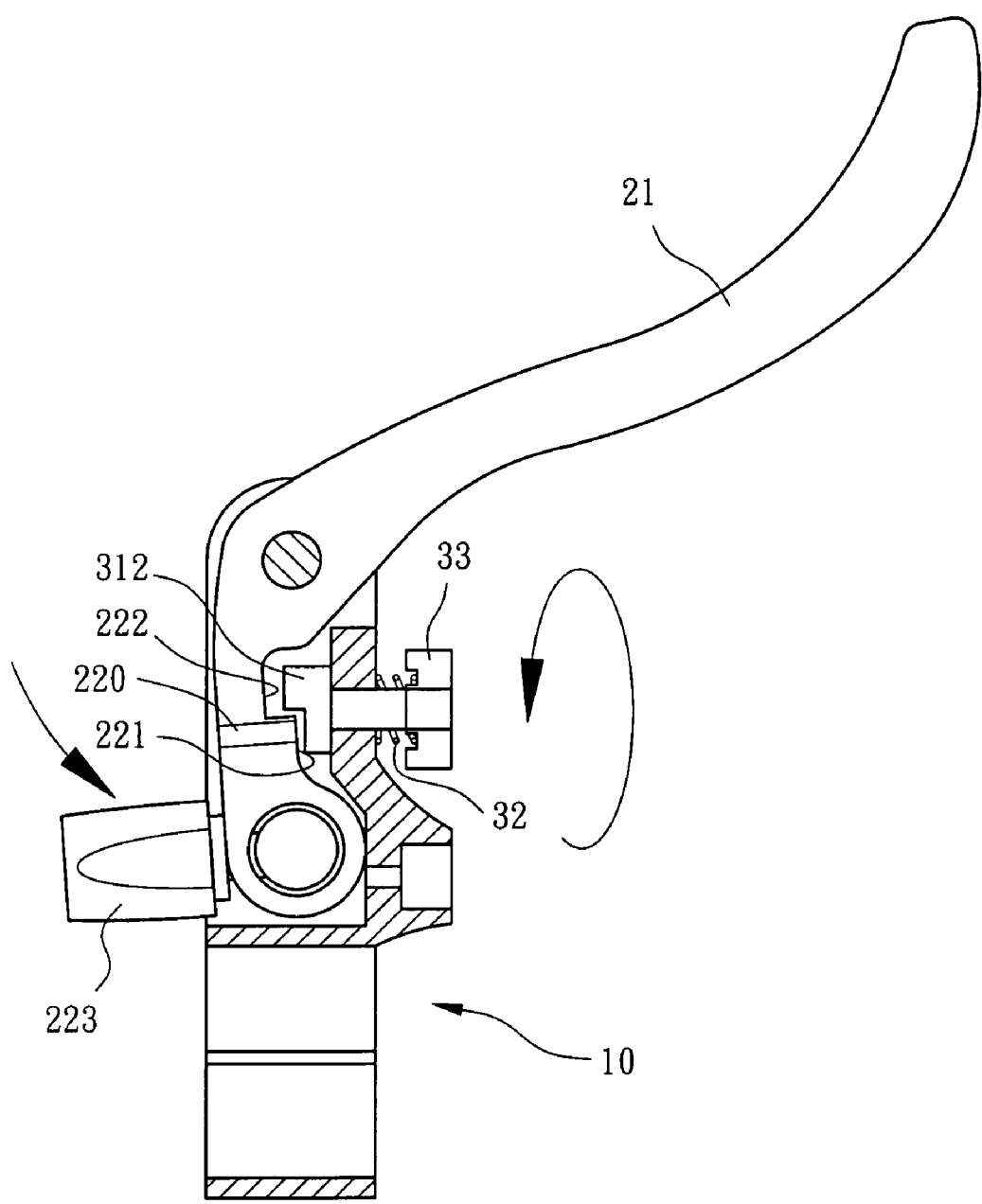
FIG. 4 is a cross-sectional view of the quick-release device in FIG. 1 when the tension of the brake cable is released.
Figure 5:
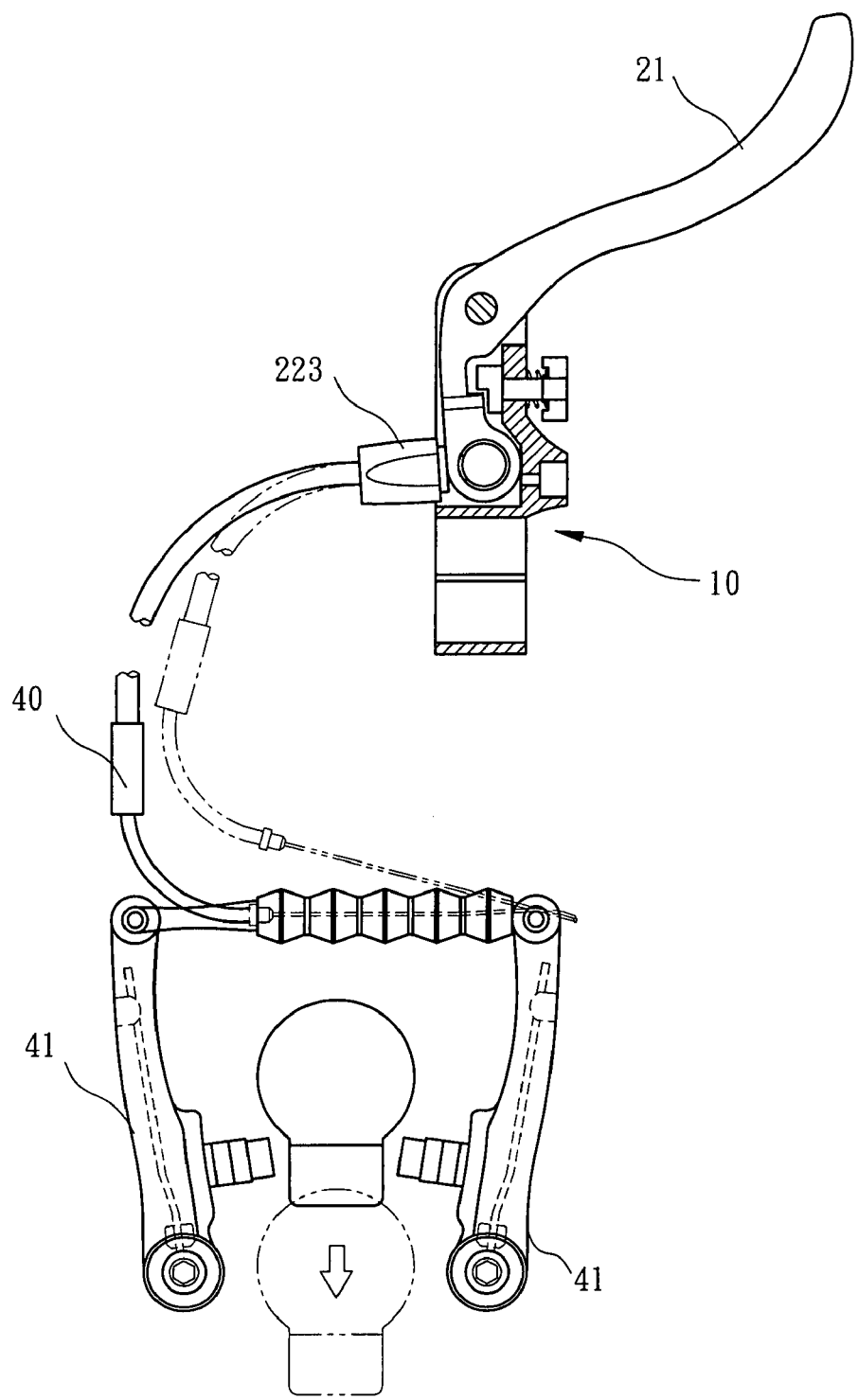
FIG. 5 is a schematic view of the quick-release device of a bicycle brake cable in accordance with the present invention.

With reference to FIGS. 4 and 5, when operating the present invention, the rider firstly inwardly holds the holding section (21) to act for brake and make the drive section (22) be disengaged from the axle (31), and rotates the axle (31) for 180 degrees by using the knob (33) to make the block (312) correspond to the groove (222), wherein the torsion spring (32) is wrenched at the same time. The lever (20) is inwardly moved relative to an original position thereof because the block (312) is received in the groove when the holding section (21) is released. The outer tube of the brake cable will inwardly moved with the pusher (223) and a gap will formed between the outer tube and the brake device of a bicycle such that the user can easily detach the brake cable with the curved tube (40) from the brake device of a bicycle to outwardly open the brake arms (41) of the brake device of a bicycle. As a result, the user can easily detach the wheel from the brake device of a bicycle for replacement. After the wheel being changed, firstly, the curved tube (40) with the brake cable is moved to its original position and the holding section (21) of the lever (20) is operated again. The torsion spring (32) rotates the axle (31) to an original position because the block (312) of the axle (31) is disengaged from the groove (222). Consequently, the block (312) abuts against the push face (221) again when the lever (20) is released.

Furthermore, with reference to FIG. 3, the drive section (22) further includes a threaded hole (220) defined therein and extending therethrough. The threaded hole (220) extends to the push face (221) and a blot (not shown) is selectively screwed into the threaded hole (220) for adjusting the relative position between the drive section (2) (22) and the push device (30).

Although the invention has been explained in relation to its preferred embodiment, it is to be understood that many other possible modifications and variations can be made without departing from the spirit and scope of the invention as hereinafter claimed.

What is claimed is:

1. A quick-release device of a bicycle brake cable, comprising a main frame adapted to be mounted to a handlebar of a bicycle, a lever pivotally mounted to the main frame and a push device mounted in the main frame to normally push the lever for maintaining the tension of the brake cable, the lever having a pivot point that divides the lever into a holding section and a drive section, wherein the drive section is received in the main frame when the lever is in a free condition, the drive section of the lever having a push face formed on one side thereof and facing the main frame, and a groove defined in the drive section between the push face and the pivot point of the lever, a pusher mounted to a free end of the drive section, the pusher adapted to push an outer tube of the brake cable for braking a wheel when the holding section is squeezed, the push device including an axle rotatably extending through the main frame, the axle having an enlarged head facing the drive section, the enlarged head having a block extending therefrom and abutting against the push face when the lever is in a free condition, a pivot extending from the enlarged head and running through the main frame, a torsion spring and a knob sequentially sleeved on and mounted to the pivot after the pivot extending through the main frame, the knob adapted to rotate the axle and the torsion spring providing a restitution force to the axle after being rotated.

* * * * *